(12) United States Patent
Nakae et al.

(10) Patent No.: US 9,797,741 B2
(45) Date of Patent: Oct. 24, 2017

(54) MAP INFORMATION PROCESSING APPARATUS AND MAP INFORMATION PROCESSING METHOD

(71) Applicant: MITSUBISHI ELECTRIC CORPORATION, Tokyo (JP)

(72) Inventors: Tomohiro Nakae, Tokyo (JP); Makoto Mikuriya, Tokyo (JP); Hidehiko Ohki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 7 days.

(21) Appl. No.: 14/769,013

(22) PCT Filed: Aug. 9, 2013

(86) PCT No.: PCT/JP2013/071659
§ 371 (c)(1),
(2) Date: Aug. 19, 2015

(87) PCT Pub. No.: WO2014/188610
PCT Pub. Date: Nov. 27, 2014

(65) Prior Publication Data
US 2016/0003638 A1    Jan. 7, 2016

(30) Foreign Application Priority Data

May 24, 2013    (JP) .................................. 2013-110088

(51) Int. Cl.
*G01C 21/36*    (2006.01)
*G01C 21/32*    (2006.01)

(52) U.S. Cl.
CPC ......... *G01C 21/3679* (2013.01); *G01C 21/32* (2013.01); *G01C 21/3685* (2013.01); *G01C 21/3691* (2013.01)

(58) Field of Classification Search
CPC  G01C 21/3679; G01C 21/32; G01C 21/3691; G01C 21/3685
See application file for complete search history.

(56) References Cited

U.S. PATENT DOCUMENTS

| 5,790,973 A | * | 8/1998 | Blaker | ................... | B60K 35/00 340/991 |
| 6,028,537 A | * | 2/2000 | Suman | ................... | B60K 35/00 340/426.14 |

(Continued)

FOREIGN PATENT DOCUMENTS

| CN | 101465061 A | 6/2009 |
| CN | 101589415 A | 11/2009 |

(Continued)

OTHER PUBLICATIONS

Office Action issued Mar. 21, 2017 in Chinese counterpart Application No. 201380076776.5 with an English Translation.

*Primary Examiner* — Frederick Brushaber
(74) *Attorney, Agent, or Firm* — Birch, Stewart, Kolasch & Birch, LLP (57) ABSTRACT

The present invention has an object to provide a technique capable of appropriately determining whether a vehicle has entered a facility range. A navigation apparatus includes a storage, a position detector, and an entry determining unit. The storage stores map information including a facility range. The position detector detects a position of an own vehicle. The entry determining unit determines that, in a case where the position of the own vehicle detected by the position detector has entered an entry determination range associated with the facility range, the own vehicle has entered the facility range.

10 Claims, 6 Drawing Sheets

(56) References Cited

U.S. PATENT DOCUMENTS

| | | | | |
|---|---|---|---|---|
| 6,282,493 | B1* | 8/2001 | Kitagawa | G01C 21/3682 340/995.24 |
| 7,480,514 | B2* | 1/2009 | Karaoguz | G01C 21/20 455/404.2 |
| 7,499,800 | B2* | 3/2009 | Kimura | G01C 21/3682 340/995.18 |
| 7,636,629 | B2* | 12/2009 | Tajima | G01C 21/36 340/995.1 |
| 7,715,980 | B2* | 5/2010 | Bargeron | G01C 21/3667 340/995.1 |
| 7,818,122 | B2* | 10/2010 | Tobiyama | G01C 21/3679 340/995.24 |
| 8,014,792 | B2* | 9/2011 | Sato | G06F 17/3087 340/988 |
| 8,069,412 | B2* | 11/2011 | Bankston | G06Q 10/00 715/255 |
| 2002/0188400 | A1* | 12/2002 | Sato | G01C 21/3415 701/455 |
| 2006/0142939 | A1* | 6/2006 | Muramatsu | G01C 21/3626 701/420 |
| 2007/0005238 | A1* | 1/2007 | Adachi | G01C 21/34 701/533 |
| 2009/0207170 | A1* | 8/2009 | Matsunaga | G01C 21/32 345/427 |
| 2009/0222199 | A1* | 9/2009 | Nishiura | G01C 21/3679 701/533 |
| 2009/0271102 | A1 | 10/2009 | Inoguchi et al. | |
| 2010/0138144 | A1 | 6/2010 | Goto et al. | |
| 2012/0078504 | A1* | 3/2012 | Zhou | G01C 21/3611 701/411 |
| 2013/0166339 | A1* | 6/2013 | Reese | G01C 21/32 705/7.13 |

FOREIGN PATENT DOCUMENTS

| | | |
|---|---|---|
| CN | 101669011 A | 3/2010 |
| JP | 8-292043 A | 11/1996 |
| JP | 2001-41761 A | 2/2001 |
| JP | 2007-93455 A | 4/2007 |
| JP | 2011-22828 A | 2/2011 |
| JP | 2011-100343 A | 5/2011 |
| JP | 2011-106960 A | 6/2011 |
| JP | 2012-047643 A | 3/2012 |
| JP | 2012-118025 A | 6/2012 |

* cited by examiner

MAP INFORMATION PROCESSING APPARATUS AND MAP INFORMATION PROCESSING METHOD

TECHNICAL FIELD

The present invention relates to a map information processing apparatus and a method for processing map information, and particularly to a map information processing apparatus that determines whether a vehicle has entered a facility range such as a parking lot and a method for processing the same.

BACKGROUND ART

A navigation apparatus that searches for a route from the current position to a destination by processing map information and guides a user such as a driver to the destination through the route is known as a kind of map information processing apparatus. In recent years, a various techniques have been proposed in connection with such a navigation apparatus. For example, Patent Document 1 discloses the navigation apparatus that adjusts, when detecting a deviation made by the own vehicle from a particular travel route during traveling, the current position of the own vehicle to be indicated on the destination facility range in accordance with the deviation.

PRIOR ART DOCUMENT

Patent Document

Patent Document 1: Japanese Patent Application Laid-Open No. 2007-093455

SUMMARY OF INVENTION

Problem to be Solved by the Invention

The navigation apparatus disclosed in Patent Document 1 is capable of determining that, in a case where the own vehicle has deviated from a particular travel route, the own vehicle has entered a facility range such as a parking lot. However, this approach sometimes makes an erroneous determination that the own vehicle has entered the facility range even though the own vehicle has not entered the facility range in actuality.

The present invention therefore has been made in view of the above-mentioned problem, and an object thereof is to provide a technique capable of appropriately determining whether the own vehicle has entered a facility range.

Means to Solve the Problem

A map information processing apparatus according to the present invention includes a processor to execute a program, and a memory to store the program. The program when executed by the processor, results in performance of steps that include, acquiring map information including a facility range and road links, at least one of the road links being associated with the facility range, acquiring a position of a vehicle, acquiring one road link brought into correspondence with the position of the vehicle by comparing the position of the vehicle acquired with the road links of the map information, and determining that, in a case where the one road link acquired is the road link associated with the facility range and the position of the vehicle acquired has entered a predetermined first range associated with the facility range, the vehicle has entered the facility range.

Effects of the Invention

The present invention can make an appropriate determination whether the vehicle has entered the facility range.

DESCRIPTION OF EMBODIMENTS

First Embodiment

Figure 1:
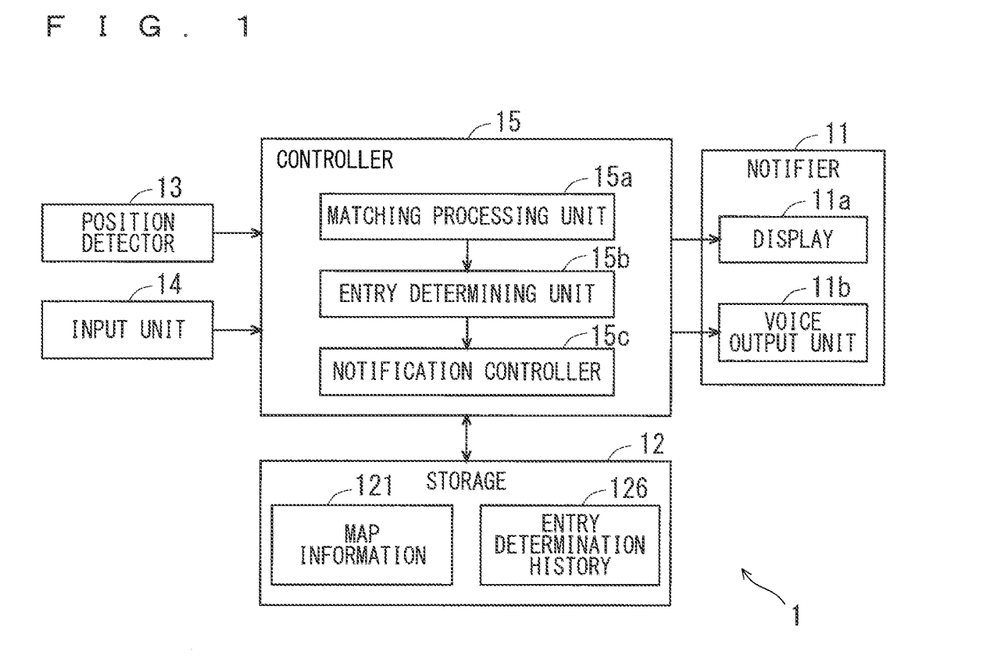
FIG. 1 A block diagram showing a configuration of a navigation apparatus according to a first embodiment.

As a first embodiment of the present invention, the following describes an example in which a map information processing apparatus according to the present invention is applied to a navigation apparatus mounted on a vehicle. FIG. 1 is a block diagram showing a configuration of the navigation apparatus. The vehicle on which a navigation apparatus 1 in FIG. 1 is mounted is hereinafter referred to as "own vehicle."

The navigation apparatus 1 includes a notifier 11, a storage 12, a position detector 13, an input unit 14, and a controller 15 that exercises centralized control over these components.

The notifier 11 notifies a driver (user) of various kinds of information. The notifier 11 above includes a display 11a and a voice output unit 11b. The display 11a includes, for example, a liquid crystal display and notifies the driver of various kinds of information through displaying. The voice output unit 11b includes, for example, a speaker and notifies the driver of various kinds of information by voice.

The storage 12 includes, for example, a storage device such as a hard disk drive (HDD), a digital versatile disc (DVD) and its drive, a Blu-ray Disk and its drive, or a semiconductor memory. At the time of, for example, product shipment, the storage 12 (map information acquiring unit) acquires, from the outside of the navigation apparatus 1, not only map information 121 but also other information necessary to provide the navigation function (such as the information needed to search for a route and the information needed to guide the driver to the destination through the route) and stores such information after the acquisition.

Figure 2:
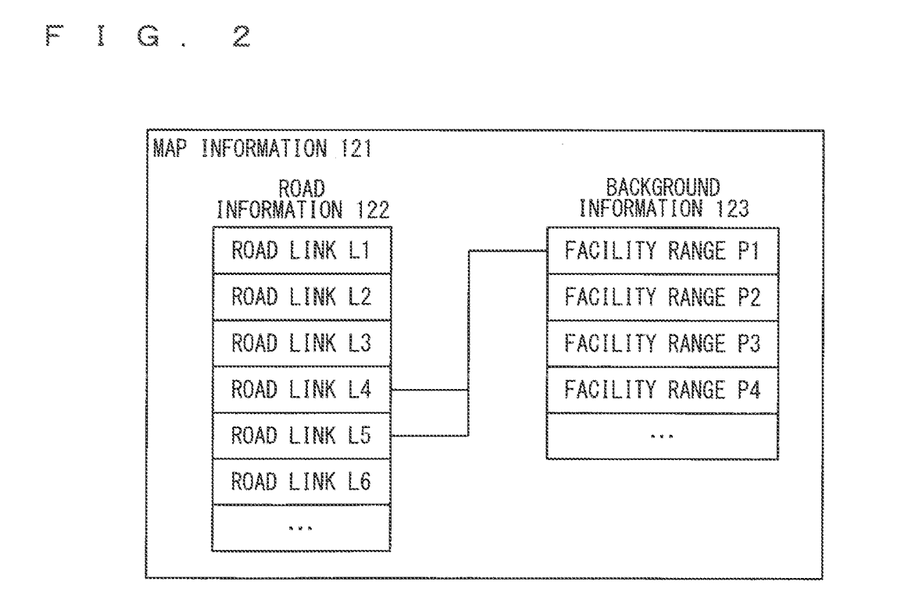
FIG. 2 A diagram showing an example of a data configuration of map information.

FIG. 2 is a diagram showing an example of a data configuration of the map information 121 stored in the storage 12. The map information 121 includes road information 122 and background information 123.

The road information 122 includes link data on each of road links L1, L2, L3, . . . into which a road is divided. The link data on the road link L1 includes, for example, properties (such as the name, the width, the number of lanes, and the traffic regulation), shapes (such as a straight line or a circular arc), and the relation of connection (such as the information indicating the road link adjacent to the road link L1) that are related to the road link L1. The link data on the road links L1, L2, L3, . . . is hereinafter also referred to as the road links L1, L2, L3, . . . , respectively, for short.

The background information 123 includes polygon data indicating the range of facilities (such as rest areas and parking areas on expressways and parking lots of shopping malls, schools, and factories) on the map and line data indicating linear shapes such as rivers on the map. The range of facilities on the map included in the background information 123 is hereinafter referred to as "facility range." For each of facility ranges P1, P2, P3 . . . , the background information 123 in FIG. 2 includes the polygon data indicating the facility range.

Figure 3:
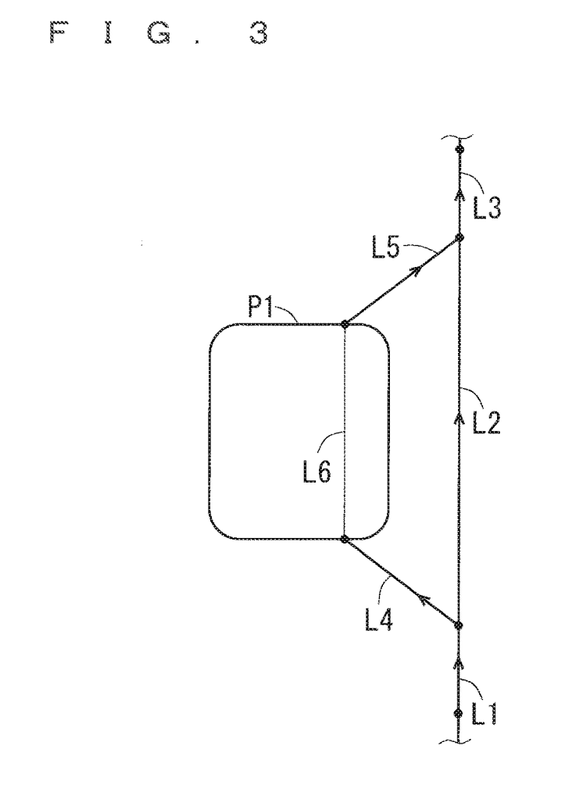
FIG. 3 A diagram describing an example of road information and background information included in the map information.

FIG. 3 is a diagram describing an example of the road information 122 and the background information 123 included in the map information 121 mentioned above. FIG. 3 indicates, from among the facility ranges included in the background information 123, the facility range P1 allocated to the parking lot of a shopping mall and indicates, from among the road links included in the road info nation 122, the road links L1 to L5 around the facility range P1 and the road link L6 inside the facility range P1.

In particular, the road links L1 to L3 are the road links allocated to the roads extending in a straight line around the facility range P1 and the road link L4 is the road link allocated to the road that connects the road link L1 and the facility range P1. The road link L5 is the road link allocated to the road that connects the facility range P1 and the road link L3 and the road link L6 is the road link that is connected to the road links L4 and L5 in the facility range P1. The arrows affixed to the road links L1 to L5 in FIG. 3 indicates the directions in which the vehicle can travel.

In the map information 121, at least one of the facility ranges in the background information 123 is associated with at least one of the road links in the road information 122. For example, in the map information 121 shown in FIG. 2, the facility range P1 is associated with the road links L4 and L5 that are connected with the facility range P1. The road links that are associated with the facility ranges of the map information 121, such as the road links L4 and L5, are hereinafter also referred to as "associated road links."

Referring back to FIG. 1, the storage 12 stores, as appropriate, not only the map information 121 described above but also an entry determination history 126 through control by the controller 15. The entry determination history 126 will be described later in detail.

The position detector 13 includes at least one of, for example, a global positioning system (GPS) receiver that receives GPS signals from a GPS satellite, a vehicle velocity sensor that detects the velocity of the own vehicle, an acceleration sensor that detects the acceleration of the own vehicle, and an angular velocity sensor that detects the angular velocity such as the yaw angular velocity of the own vehicle. In a case where the position detector 13 (position acquiring unit) includes the GPS receiver, it detects (acquires) the current position (such as the coordinates of the latitude and the longitude) of the own vehicle on the map on the basis of, for example, GPS signals. The position detector 13 outputs the detected current position of the own vehicle to the controller 15.

The input unit 14 includes, for example, push buttons or a touch panel integrated into the display 11a. The input unit 14 receives various kinds of information such as operations and instructions from the driver and outputs signals corresponding to the received information to the controller 15.

The controller 15 includes, for example, a central processing unit (CPU) and a cache memory such as a writable random access memory (RAM). The CPU processes data on the basis of the program stored in, for example, the storage 12 and the cache memory functions as the buffer memory that temporarily stores the data processed by the CPU, operations and instructions received from the driver, and the like, thereby providing the functions of a matching processing unit 15a, an entry determining unit 15b, and a notification controller 15c.

Although not being described in detail, the same holds true for the navigation function (not shown) of searching for a route from the current position to the destination on the basis of instruction signals in accordance with the driver's instructions received from the input unit 14, the current position of the own vehicle detected by the position detector 13, and the map information 121 stored in the storage 12 and of guiding the driver to the destination through the searched route. Note that one CPU does not necessarily provide all of these functions. For example, one CPU may provide one function. The following describes each of the matching processing unit 15a, the entry determining unit 15b, and the notification controller 15c.

The matching processing unit 15a (link acquiring unit) compares the current position of the own vehicle detected by the position detector 13 with the road links of the map information 121, to thereby bring the current position of the own vehicle into correspondence with one road link. For example, the matching processing unit 15a brings the current position of the own vehicle into correspondence with one road link closest to the current position.

The matching processing unit 15a performs, as appropriate, a matching processing for matching (correcting) the current position of the own vehicle detected by the position detector 13 with the above-mentioned road link. The navigation apparatus 1 performs the matching processing to improve the accuracy of the current position of the own vehicle.

The following briefly describes the function of the entry determining unit 15b, which will be described later in detail with reference to a flowchart.

In a case where the relevant road link brought into correspondence by the matching processing unit 15a is the road link associated with a facility range and the current position of the own vehicle detected by the position detector 13 has entered the predetermined entry determination range (first range) associated with the facility range, the entry determining unit 15b (determining unit) determines that the own vehicle has entered the facility range. In a case where the current position of the own vehicle acquired by the position detector 13 has exited the entry determination range (first range) after the determination that the own vehicle has entered the facility range, the entry determining unit 15b determines that the own vehicle has exited the facility range.

The notification controller 15c has, for example, a rendering processing function of processing the rendering, a rendering storage function of temporarily storing the rendered data created by the rendering processing function, a display control function of causing the display 11a to display various kinds of information such as the rendered data, and a voice output control function of causing the voice output unit 11*b* to output various kinds of information by voice.

The notification controller 15*c* causes the notifier 11 to notify the reverse traveling of the own vehicle or causes the notifier 11 to notify the exit traveling of the own vehicle depending on, for example, the determination results provided by the entry determining unit 15*b*. These notifications are provided through at least one of the displaying by the display 11*a* and the voice output provided by the voice output unit 11*b*.

The following describes the operation of the navigation apparatus 1 according to the first embodiment configured as described above.

<Initial Operation>

Figure 4:
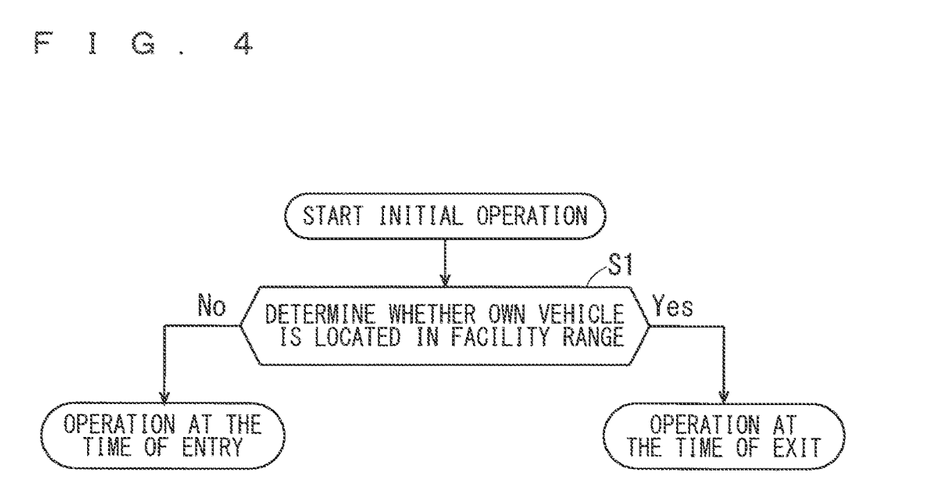
FIG. 4 A flowchart showing an operation of the navigation apparatus according to the first embodiment.

FIG. 4 is a flowchart showing the operation of the navigation apparatus 1 according to the first embodiment. FIG. 4 shows the initial operation immediately after the startup of the navigation apparatus 1. Prior to the description of the initial operation of the navigation apparatus 1 with reference to FIG. 4, the entry determination history 126 (determination history of entry) is described below.

The entry determination history 126 is, as described below, stored in the storage 12 in a case where the entry determining unit 15*b* determines that the own vehicle has entered the facility range in Step S18 in FIG. 5. Then, the entry determination history 126 is deleted from the storage 12 in a case where the entry determining unit 15*b* determines that the own vehicle has exited the facility range in Step S37 in FIG. 7 (in a case where the current position of the own vehicle acquired by the position detector 13 has exited the entry determination range after the determination that the own vehicle has entered the facility range). The entry determination history 126 is stored in the nonvolatile storage area of the storage 12 such that the storage state is maintained regardless of turning on and off of the power of the navigation apparatus 1.

That is, according to the first embodiment, the storage state of the entry determination history 126 is maintained between when the entry determining unit 15*b* determines that the own vehicle has entered the facility range and when the entry determining unit 15*b* determines that the own vehicle has exited the facility range, in other words, for the duration of the time the vehicle is located in the facility range.

Thus, in Step S1 of the initial operation shown in FIG. 4, the controller 15 determines whether the own vehicle is located in the facility range based on whether the entry determination history 126 is stored in the storage 12. If the entry determination history 126 is not stored in the storage 12, the controller 15 determines that the own vehicle is not located in the facility range (the current point of time is not at a midpoint of a period between when the entry determining unit 15*b* determines that the own vehicle has entered the facility range and when the current position of the own vehicle detected by the position detector 13 exits the entry determination range of the facility range), and thus, starts the operation at the time of entry shown in FIG. 5. If the entry determination history 126 is stored in the storage 12, meanwhile, the controller 15 determines that the own vehicle is located in the facility range (the current point of time is at a midpoint of a period between when the entry determining unit 15*b* determines that the own vehicle has entered the facility range and when the current position of the own vehicle detected by the position detector 13 exits the entry determination range of the facility range), and thus, starts the operation at the time of exit shown in FIG. 7.

The navigation apparatus 1 according to the first embodiment configured as described above determines whether the own vehicle is located in the facility range based on whether the entry determination history 126 is stored in the storage 12. This can provide a different operation in each case where the own vehicle located in the facility range or the own vehicle located outside the facility range. The following describes, in detail, the operation at a time when the own vehicle enters the facility range and the operation at a time when the own vehicle exits the facility range.

<Operation at the Time of Entry>

Figure 5:
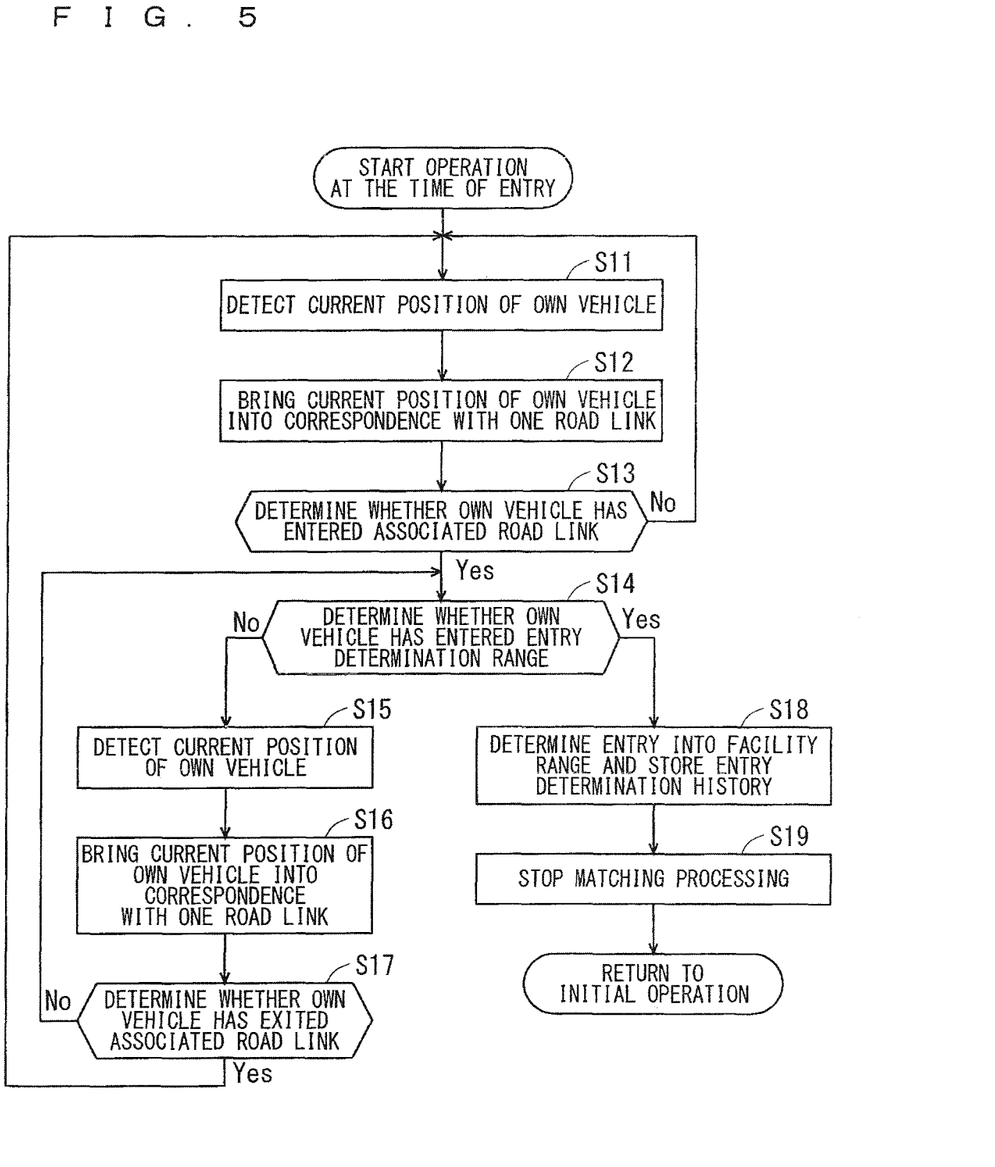
FIG. 5 A flowchart showing an operation of the navigation apparatus according to the first embodiment.
Figure 6:
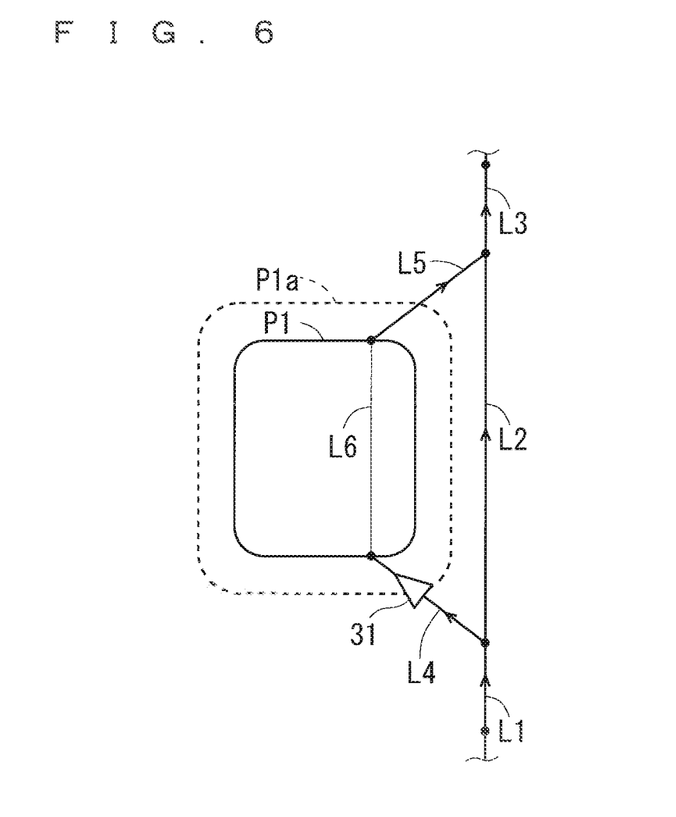
FIG. 6 A diagram describing an operation of the navigation apparatus according to the first embodiment.

FIG. 5 is a flowchart showing an operation of the navigation apparatus 1 according to the first embodiment at a time when the own vehicle enters the facility range. FIG. 6 is a diagram describing the operation of the navigation apparatus 1 at a time when an own vehicle 31 enters the facility range P1 in the example shown in FIGS. 2 and 3. In FIG. 6, a mark shaped in an isosceles triangle whose vertex triangle portion points the traveling direction of the own vehicle 31 is indicated at the position of the own vehicle 31 on the map (the same holds true for the diagrams following FIG. 6). With reference to FIGS. 5 and 6, the following describes the operation of the navigation apparatus 1 at a time when the own vehicle enters the facility range.

With reference to FIG. 5, firstly, the position detector 13 detects the current position of the own vehicle in Step S11.

In Step S12, the matching processing unit 15*a* compares the current position of the own vehicle detected in Step S11 with the road links of the map information 121, to thereby bring the current position of the own vehicle into correspondence with one road link.

In the example shown in FIG. 6, the matching processing unit 15*a* brings the current position of the own vehicle 31 into correspondence with the road link L4 in Step S12.

In Step S13, the entry determining unit 15*b* determines whether the own vehicle has entered the associated road link (the road link connected with the facility range). If the relevant road link brought into correspondence in Step S12 is the associated road link, the entry determining unit 15*b* determines that the own vehicle has entered the associated road link. If the relevant road link is not the associated road link, the entry determining unit 15 determines that the own vehicle has not entered the associated road link.

In the example shown in FIG. 6, the relevant road link L4 brought into correspondence in Step S12 is associated with the facility range P1 in the map information 121 shown in FIG. 2. Thus, in Step S13, the entry determining unit 15*b* determines that the own vehicle 31 has entered the associated road link.

If it is determined in Step S13 that the own vehicle has entered the associated road link, the operation proceeds to Step S14. If it is determined in Step S13 that the own vehicle has not entered the associated road link, the operation returns to Step S11.

In Step S14, the entry determining unit 15*b* acquires, from the map information 121 (FIG. 2), one facility range associated with the associated road link in which an entry of the own vehicle has been determined in Step S13. Then, the entry determining unit 15*b* acquires the entry determination range (first range) associated with the relevant facility range. In particular, the facility ranges and the entry determination ranges are, in advance, associated with each other and stored in the storage 12, and the entry determining unit 15*b* acquires, from the storage 12, the entry determination range associated with the relevant facility range that has been acquired.

In the example shown in FIG. 6, the entry determining unit 15b acquires, in Step S14, the facility range P1 associated with the road link L4 from the map information 121. Then, the entry determining unit 15b acquires an entry determination range P1a (the range enclosed by a broken line in FIG. 6) associated with the facility range P1.

Subsequent to that, in Step S14, the entry determining unit 15b determines whether the current position of the own vehicle detected in Step S11 has entered the entry determination range.

In the example shown in FIG. 6, the current position of the own vehicle 31 has entered the entry determination range P1a. Therefore, in Step S14, the entry determining unit 15b determines the entry into the entry determination range P1a.

If it is determined in Step S14 that the own vehicle has not entered the entry determination range, the operation proceeds to Step S15. If it is determined in Step S14 that the own vehicle has entered the entry determination range, the operation proceeds to Step S18.

In a case where the operation proceeds from the Step S14 to Step S15, the position detector 13 detects the current position of the own vehicle.

Then, in Step S16, the matching processing unit 15a compares the current position of the own vehicle detected in Step S15 with the road links of the map information 121, to thereby bring the current position of the own vehicle into correspondence with one road link.

In Step S17, the entry determining unit 15b determines whether the own vehicle has exited the associated road link. In a case where the relevant road link brought into correspondence in Step S16 is the associated road link or the road link in the facility range such as the road link L6 (FIG. 6), the entry determining unit 15b determines that the own vehicle has not exited the associated road link. Otherwise the entry determining unit 15b determines that the own vehicle has exited the associated road link.

If it is determined in Step S17 that the own vehicle has exited the associated road link, the operation returns to Step S11. If it is determined that the own vehicle has not exited the associated road link, meanwhile, the operation returns to Step S14. In a case where the operation returns to Step S14 from Step S17, the entry determining unit 15b uses, in place of the current position of the own vehicle detected in Step S11, the current position of the own vehicle newly detected in Step S15, to thereby determine whether the own vehicle has entered the entry determination range.

In a case where the operation proceeds from the Step S14 to the Step S18, the entry determining unit 15b determines that the own vehicle has entered the facility range. In the example shown in FIG. 6, the entry determining unit 15b determines that the own vehicle 31 has entered the facility range P1.

In Step S18, the controller 15 stores, as the entry determination history 126 in the storage 12, the history of determination that the own vehicle has entered the facility range.

Then, in Step S19, the matching processing unit 15a stops the matching processing. As described later in Steps S37 and S38 in FIG. 7, the stopping of the matching processing is maintained while the entry determination history 126 is stored in the storage 12, or equivalently, while the own vehicle is located in the facility range (between when the entry determining unit 15b determines that the own vehicle has entered the facility range and when the position of the own vehicle exits the entry determination range).

Regardless of whether the own vehicle is located in the facility range, the conventional navigation apparatus performs the matching processing with no exception when the position of the own vehicle deviates from the road link. Unfortunately, in such matching processing, the position of the own vehicle is matched with the road link in the vicinity of a facility range even though the own vehicle is, in actuality, located in the facility range. This ends up deteriorating the accuracy of the position of the own vehicle in some cases.

According to the first embodiment, meanwhile, the matching processing through the matching processing unit 15a is stopped while the own vehicle is located in the facility range, thereby suppressing the deterioration of accuracy of the position of the own vehicle. The matching processing is stopped only when the own vehicle is located in the facility range; the matching processing is not stopped more than necessary. The present embodiment does not require the road link in the facility range such as the road link L6, which has been provided for accurate matching processing in some cases. This promises for the reduction in the data size of the map information 121.

Subsequent to Step S19, the operation returns to the initial operation (FIG. 4).

<Operation at the Time of Exit>

Figure 7:
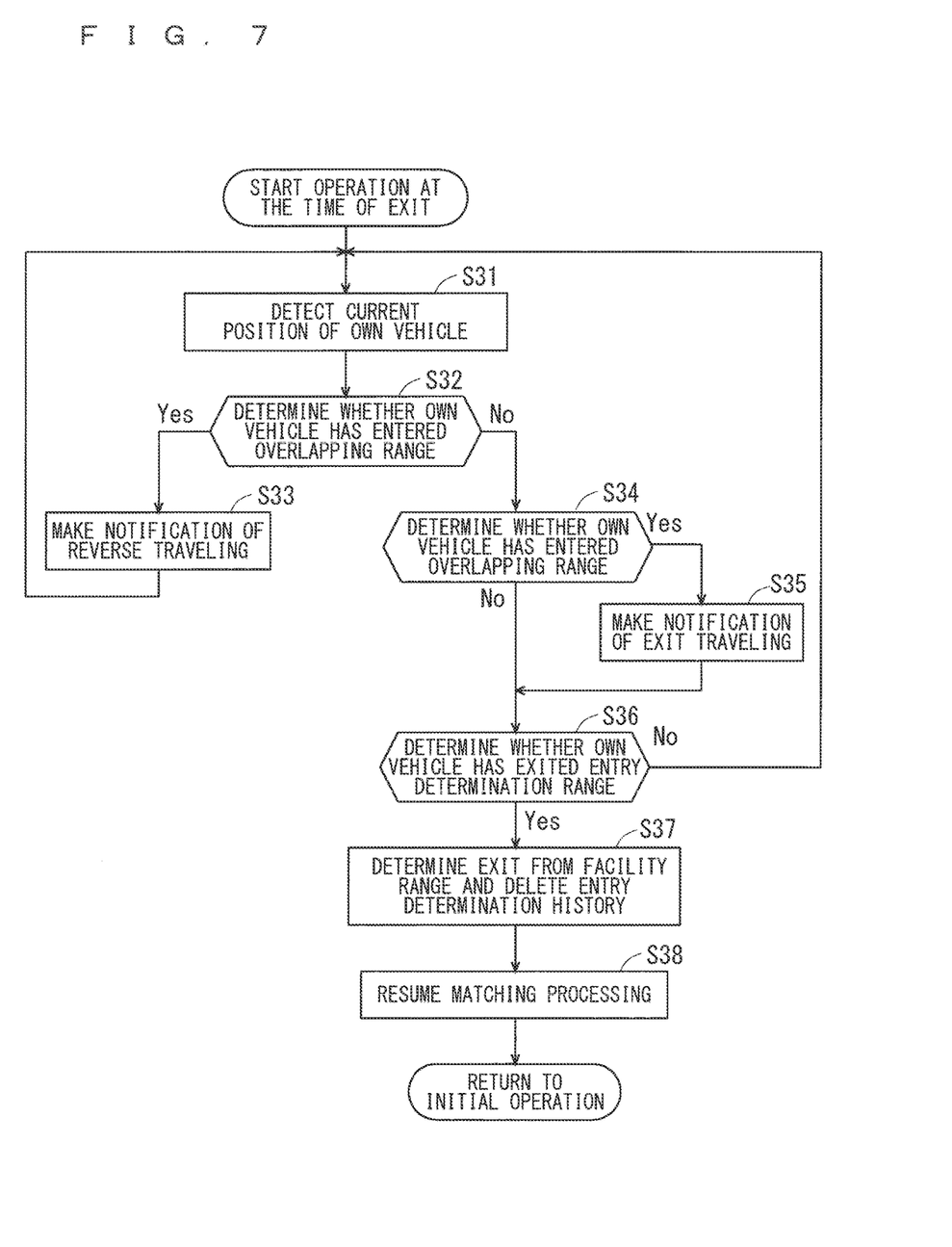
FIG. 7 A flowchart showing an operation of the navigation apparatus according to the first embodiment.
Figure 8:
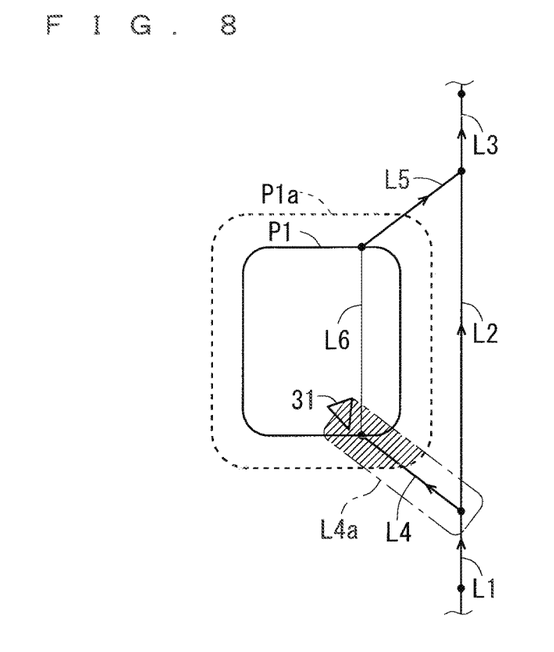
FIG. 8 A diagram describing an operation of the navigation apparatus according to the first embodiment.
Figure 9:
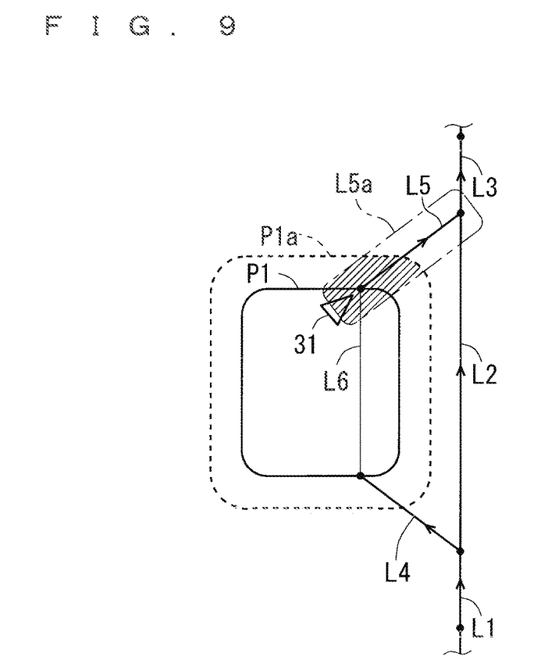
FIG. 9 A diagram describing an operation of the navigation apparatus according to the first embodiment.

FIG. 7 is a flowchart showing the operation of the navigation apparatus 1 according to the first embodiment at a time when the own vehicle exits the facility range. FIGS. 8 and 9 are diagrams describing the operation of the navigation apparatus 1 at a time when the own vehicle 31 exits the facility range P1 in the example shown in FIGS. 2 and 3. With reference to FIGS. 7 to 9, the following describes the operation of the navigation apparatus 1 at a time when the own vehicle exits the facility range.

As described above, the operation at the time of exit is started in a case where it is determined in Step S1 of the initial operation (FIG. 4) that the own vehicle is located in the facility range (or equivalently, within a period between when the entry determining unit 15b determines that the own vehicle has entered the facility range and when the position of the own vehicle exits the entry determination range).

With reference to FIG. 7, firstly, the position detector 13 detects the current position of the own vehicle in Step S31.

In Step S32, the notification controller 15c acquires one facility range in which the own vehicle is currently located, and then, acquires the entry road link associated with the relevant facility range from the map information 121. The associated road links of the map information 121 (FIG. 2) may include an entry road link allocated to an entry road for an entry into the facility range or may include an exit road link allocated to an exit road for an exit from the facility range.

The identification information for identifying the relevant associated road link as either the entry road link or the exit road link is preferably included in the link data of the road information 122 mentioned above. The following description is given on the assumption that the link data (the road information 122) of the road link L4 associated with the facility range P1 includes the information indicating that the road link L4 is the entry road link of the facility range P1. The following description is also given on the assumption that the link data (the road information 122) of the road link L5 associated with the facility range P1 includes the information indicating that the road link L5 is the exit road link of the facility range P1.

In the example shown in FIG. 8, the own vehicle 31 is located in the facility range P1. Thus, in Step S32, the notification controller 15c acquires, from the map information 121, the road link L4 associated with the facility range P1 as the entry road link.

In Step S32, the notification controller 15c acquires the predetermined reverse traveling determination range (second range) associated with the acquired entry road link. In particular, the entry road links and the reverse traveling determination ranges are, in advance, associated with each other and stored in the storage 12, and the notification controller 15c acquires, from the storage 12, the reverse traveling determination range associated with the acquired entry road link.

In the example shown in FIG. 8, the notification controller 15c acquires, in Step S32, a reverse traveling determination range L4a (the range enclosed by an alternate long and short dash line in FIG. 8) associated with the acquired road link L4 (the entry road link).

In Step S32, the notification controller 15c acquires the overlapping range shared by the entry determination range and the reverse traveling determination range. In the example shown in FIG. 8, the notification controller 15c acquires, in Step S32, the overlapping range that is indicated by hatching and is shared by the entry determination range P1a and the reverse traveling determination range L4a.

Then, in Step S32, the notification controller 15c determines whether the current position of the own vehicle detected in Step S31 has entered the above-described overlapping range. In the example shown in FIG. 8, the current position of the own vehicle 31 has entered the above-mentioned overlapping range, and thus, the notification controller 15c determines the entry into the overlapping range.

If it is determined in Step S32 that the own vehicle has entered the overlapping range, the operation proceeds to Step S33. If it is determined in Step S32 that the own vehicle has not entered the overlapping range, the operation proceeds to Step S34.

In Step S33, the notification controller 15c determines that the own vehicle is traveling in the reverse direction, and thus, causes the notifier 11 mounted on the own vehicle to make a notification of reverse traveling. Subsequent to that, the operation returns to Step S31.

In a case where the operation proceeds from the Step S32 to Step S34, the notification controller 15c subjects the exit road link to the same operation as the above-described operation performed on the entry road link. That is, in Step S34, the notification controller 15c acquires, from the map information 121, the exit road link associated with the facility range in which the own vehicle is located, and then, acquires the predetermined exit determination range (third range) associated with the exit road link. Again, the exit road links and the exit determination ranges are, in advance, associated with each other and stored in the storage 12, and the notification controller 15c acquires, from the storage 12, the exit determination range associated with the acquired exit road link.

According to the example shown in FIG. 9, in Step S34, the notification controller 15c acquires, from the map information 121, the road link L5 associated with the facility range P1 as the exit road link. Then, the notification controller 15c acquires an exit determination range 15a (the range enclosed by an alternate long and short dash line in FIG. 9) associated with the road link L5.

In Step S34, the notification controller 15c determines whether the current position of the own vehicle detected in Step S31 has entered the overlapping range shared by the entry determination range and the exit determination range.

In the example shown in FIG. 9, the current position of the own vehicle 31 has entered the overlapping range indicated by hatching, and thus, the notification controller 15c determines the entry into the overlapping range.

If it is determined in Step S34 (FIG. 7) that the own vehicle has entered the overlapping range, the operation proceeds to Step S35. If it is determined in Step S34 that the own vehicle has not entered the overlapping range, the operation proceeds to Step S36.

In Step S35, the notification controller 15c determines the exit traveling of the own vehicle, and thus, causes the notifier 11 mounted on the own vehicle to make a notification of exit traveling. Subsequent to that, the operation proceeds to Step S36.

In Step S36, the entry determining unit 15b determines whether the current position of the own vehicle detected in Step S31 has exited the entry determination range of the facility range. If it is determined that the own vehicle has exited the entry determination range, the operation proceeds to Step S37. If it is determined that the own vehicle has not exited the entry determination range, the operation returns to Step S31. The operation from Step S31 to Step S36 is repeated until it is determined in Step S36 that the current position of the own vehicle has exited the entry determination range of the facility range.

In Step S37, the entry determining unit 15b determines that the own vehicle has exited the facility range. Then, the controller 15 deletes the entry determination history 126 from the storage 12.

Subsequent to that, in Step S38, the matching processing unit 15a resumes the matching processing. Subsequent to Step S38, the operation returns to the initial operation (FIG. 4).

<Effects>

The determination whether the own vehicle has entered the facility range can be made based only on the determination made in Step S13 shown in FIG. 5. However, the position detector 13 under the present conditions is limited in its accuracy. Thus, in a case where the own vehicle is traveling on a long curve of road (such as a ramp), the current position of the own vehicle detected by the position detector 13 gradually deviates, in some cases, from the road link of the road on which the own vehicle is actually traveling.

If this is the case, there is a possibility of determining, in Step S13, that the relevant road link brought into correspondence in Step S12 is not the road link of the road on which the own vehicle is actually traveling but is the associated road link in the vicinity. Consequently, the determination whether the own vehicle has entered the facility range based only on the determination made in Step S13 may lead to an erroneous determination that the own vehicle has entered the associated road link despite the fact that the own vehicle has not entered the associated road link, so that it is erroneously determined in some cases that the own vehicle has entered the facility range.

According to the navigation apparatus 1 of the first embodiment, meanwhile, in a case where the relevant road link brought into correspondence by the matching processing unit 15a is the associated road link and the current position of the own vehicle has entered the entry determination range associated with the facility range, it is determined that the own vehicle has entered the facility range. That is, the determination whether the own vehicle has entered the facility range is made based on the determination result in Step S13 and the determination result in Step S14, whereby the above-described erroneous determination can be suppressed. This improves the accuracy of determination whether the own vehicle has entered the facility range.

According to the first embodiment, in a case where the position of the own vehicle has entered the overlapping range shared by the entry determination range and the reverse traveling range, the notifier 11 makes a notification of reverse traveling. Thus, the advance notification of reverse traveling can be provided to the driver, who can therefore drive in a more carefree manner.

According to the first embodiment, in a case where the position of the own vehicle has entered the overlapping range shared by the entry determination range and the exit determination range, the notifier 11 makes a notification of exit traveling. Thus, the advance notification of exit traveling can be provided to the driver, who can therefore drive in a more carefree manner.

<Modification of the Entry Determining Unit>

In a case where the current position of the own vehicle detected by the position detector 13 has entered the predetermined entry determination range associated with a facility range, the entry determining unit 15b may determine that the own vehicle has entered the facility range instead of making the above-mentioned determination.

In other words, subsequent to Step S11 in FIG. 5, the operation skips Steps S12 and S13 and proceeds to Step S14. In Step S14, the entry determining unit 15b determines whether the current position of the own vehicle detected in Step S11 has entered the entry determination range. If it is determined in Step S14 that the own vehicle has entered the entry determination range, the operation proceeds to Step S18. If it is determined in Step S14 that the own vehicle has not entered the entry determination range, the operation returns to Step S11.

The present modification requires only the establishment of association between the facility ranges and the entry determination ranges, and therefore, the entry into a facility can be determined through a software configuration and a hardware configuration that are relatively simple. In a case where the own vehicle has entered a facility range through a road link other than the entry road link associated with the facility range, the entry into the facility can be detected (determined).

<Modifications of the Entry Road Link and the Exit Road Link>

The description of Step S32 has been given on the assumption that the map information 121 (the road information 122) stored in the storage 12 includes the identification information for identifying the associated road link as either the entry road link or the exit road link. That is, the description has been given assuming that the identification information is stored in the storage 12 at all times.

However, the configuration is not limited to the above. At and after the determination by the entry determining unit 15b that the own vehicle has entered the facility range, the controller 15 may use, as the entry road link, the relevant road link used in the determination. This configuration can minimize the identification information necessary to provide the driver with the advance notification of reverse traveling, whereby the data size of the map information 121 can be reduced.

Similarly, at and after the determination by the entry determining unit 15b that the own vehicle has entered the facility range, the controller 15 may use, as the exit road link, a road link other than the relevant road link used in the determination from among the road links associated with the facility range. As with the above description, this configuration can minimize the identification information necessary to provide the driver with the advance notification of exit traveling, whereby the data size of the map information 121 can be reduced.

<Modifications of the Configuration for Acquiring, for Example, the Entry Determination Range>

According to the above-described configuration, the entry determining unit 15b acquires, in Step S14, the entry determination range associated with one facility range from the storage 12. However, the configuration is not limited to the above. For example, in Step S14, the entry determining unit 15b may perform the calculation processing of reducing the shape of the relevant facility range by multiplying it with a value greater than or equal to 0.8 and smaller than 1 with the center of the shape being fixed, or may perform the calculation processing of enlarging the shape by multiplying it with a value greater than 1 and smaller than or equal to 1.2 with the center of the shape being fixed, to thereby use the range of the shape obtained through the calculation processing as the entry determination range. Alternatively, in Step S14, the entry determining unit 15b may use the relevant facility range itself as the entry determination range. According to the configuration for performing the calculation processing of reduction, even if a slight amount of error in the current position of the own vehicle arises while the own vehicle is traveling on, for example, the road link L2 close to the facility range P1 shown in FIG. 3, the erroneous determination that the own vehicle has entered the facility range P1 can be suppressed.

According to the above-described configuration, the notification controller 15c acquires, in Step S32, the reverse traveling determination range associated with the entry road link from the storage 12. However, the configuration is not limited to the above. As with the above-described calculation processing of obtaining the entry determination range, the notification controller 15c may perform the calculation processing on the entry road link and use, as the reverse traveling determination range, the range of the shape obtained through the calculation processing. Likewise, the notification controller 15c may perform the calculation processing on the exit road link and use, as the exit determination range, the range of the shape obtained through the calculation processing.

<Modifications of the Map Information 121>

As described above, in the map information 121 (FIG. 2), the road links of the road information 122 have been associated with the facility ranges in the background information 123. The following describes a first example and a second example of a configuration for establishing such association. Note that the configuration for establishing the association is not limited to the first and second examples described below.

Firstly, as the first example, the storage 12 prestores a table in which the facility ranges and the road links are associated with each other. According to the configuration of the first example, in Step S14 (FIG. 5), the entry determining unit 15b can acquire, on the basis of the table and the road link in which an entry of the own vehicle has been determined in Step S13, the facility range associated with the road link. In Step S32 (FIG. 7), the notification controller 15c can acquire, on the basis of the table above and the facility range in which the own vehicle is located, the entry road link associated with the facility range.

As the second example, the link data of the road links includes the polygon identification information (such as the polygon ID or the storage address of the polygon data) for identifying the polygon data of the facility ranges associated with the road links. The polygon data of the facility ranges includes the link identification information (such as the link ID or the storage address of the link data) for identifying the link data of the road links associated with the facility ranges.

According to the configuration of the second example, in Step S14 (FIG. 5), the entry determining unit 15b refers to the polygon identification information included in the link data of the road link in which an entry of the own vehicle has been determined in Step S13, to thereby acquire the facility range associated with the road link. In Step S32 (FIG. 7), the notification controller 15c refers to the link identification information included in the polygon data of the facility range in which the own vehicle is located, to thereby acquire the entry road link associated with the facility range.

<Modifications in Which the Map Information Processing Apparatus is Applied to Apparatuses Other Than the Navigation Apparatus>

The map information processing apparatus described above is applicable not only to the navigation apparatus 1 provided in the vehicle but also to the map information processing apparatus formulated as a system by combining, as appropriate, a portable navigation device (PND) and a portable terminal (such as a mobile cellular phone, a smartphone, and a tablet) that can be mounted on the vehicle, a server, and the like. If this is the case, the respective functions or the respective constituent components of the navigation apparatus 1 described above are dispersedly located in the instruments that configure the system above.

For example, according to the configuration described above, the map information processing apparatus has been applied to the navigation apparatus 1, which is not limited thereto. Alternatively, the map information processing apparatus may be applied to any one of the PND, the portable terminal, and the server.

According to the above-described configuration, the storage 12, which acquires the map information 121 at the time of, for example, product shipment and stores the map information 121 after the acquisition, has been applied to the map information acquiring unit. However, the map information acquiring unit is not limited to the storage 12 as long as being capable of acquiring the map information 121 and may be, for example, a communication unit configured to receive the map information 121. In a case where the map information processing apparatus is applied to a smartphone, the storage that is among the constituent components of the smartphone and is equivalent to the storage 12 may be applied to the map information acquiring unit. In a case where the map information processing apparatus is applied to a server, the storage that is among the constituent components of the server and is equivalent to the storage 12 may be applied to the map acquiring unit.

According to the above-described configuration, the position detector 13, which detects the current position of the own vehicle, is applied to the position acquiring unit. However, the position acquiring unit is not limited to the position detector 13 as long as being capable of acquiring the position of the vehicle under observation. In a case where the map information processing apparatus is applied to a smartphone, the detector that is among the constituent components of the smartphone and is equivalent to the position detector 13 may be applied to the position acquiring unit. In a case where the map information processing apparatus is applied to a server, the communication unit that is among the constituent components of the server and receives the position of the vehicle under observation may be applied to the position acquiring unit.

According to the above-described configuration, the matching processing unit 15a, which compares the current position of the own vehicle detected by the position detector 13 with the road links of the map information 121 to bring the current position of the own vehicle into correspondence with one road link, is applied to the link acquiring unit. However, the link acquiring unit is not limited to the matching processing unit 15a as long as being capable of comparing the position of the vehicle acquired by the position acquiring unit with the road links of the map information 121 to acquire the relevant road link brought into correspondence with the position of the vehicle, and thus, the link acquiring unit may be, for example, a communication unit configured to be capable of receiving the above-described establishment of correspondence from the server and the like. In a case where the map information processing apparatus is applied to a smartphone, a processing unit that is among the constituent components of the smartphone and is equivalent to the matching processing unit 15a may be applied to the link acquiring unit. In a case where the map information processing apparatus is applied to a server, the processing unit that is among the constituent components of the server and is equivalent to the matching processing unit 15a may be applied to the link acquiring unit. The modification similar to that of the matching processing unit 15a is applicable to the determining unit and the notification controller.

According to the above-described configuration, the notifier 11 of the navigation apparatus 1 is applied to the notifier. However, the notifier is not limited to the notifier 11 of the navigation apparatus 1 as long as being capable of making a notification of information. For example, the notifier that is among the constituent components of a smartphone and is equivalent to the notifier 11 may be applied to the notifier.

In the present invention, the above embodiment can be appropriately varied or omitted within the scope of the invention.

EXPLANATION OF REFERENCE SIGNS 1 navigation apparatus, 11 notifier, 12 storage, 13 position detector, 15a matching processing unit, 15b entry determining unit, 15c notification controller, 121 map information, 126 entry determination history, L1 to L6 road link, L4a reverse traveling determination range, L5a exit determination range, P1 facility range, P1a entry determination range.

The invention claimed is:
1. A map information processing apparatus comprising:
a processor to execute a program; and
a memory to store the program which, when executed by the processor, results in performance of steps comprising,
acquiring map information including a facility range and road links, at least one of the road links being associated with said facility range,
acquiring a position of a vehicle using a vehicle position detector,
acquiring one road link brought into correspondence with the position of the vehicle by comparing the position of the vehicle acquired with the road links of said map information, and
determining that, in a case where the one road link acquired is the road link associated with said facility range and the position of the vehicle acquired has entered a predetermined first range associated with said facility range, said vehicle has entered the facility range.
2. The map information processing apparatus according to claim 1, wherein acquiring the one road link includes performing a matching processing of matching the position of the vehicle acquired with said one road link, and the matching processing by acquiring the one road link is stopped between when it is determined that said vehicle has entered said facility range in said determining and when the position of the vehicle acquired exits said first range of the facility range.

3. The map information processing apparatus according to claim 1, wherein the road link associated with said facility range includes an entry road link allocated to an entry road for an entry into said facility range, and said steps further comprise causing a notifier mounted on said vehicle to make a notification of reverse traveling in a case where the position of said vehicle has entered an overlapping range shared by said first range and a predetermined second range associated with said entry road link from a range other than said second range of said first range between when it is determined that said vehicle has entered said facility range in said determining and when the position of the vehicle acquired exits said first range of the facility range.

4. The map information processing apparatus according to claim 3, wherein at and after the determination that said vehicle has entered said facility range in said determining, said one road link used in the determination is used as said entry road link.

5. The map information processing apparatus according to claim 1, wherein the road link associated with said facility range includes an exit road link allocated to an exit road for an exit from said facility range, and said steps further comprise causing a notifier mounted on said vehicle to make a notification of exit traveling in a case where the position of said vehicle has entered an overlapping range shared by said first range and a predetermined third range associated with said exit road link from a range other than said third range of said first range between when it is determined that said vehicle has entered said facility range in said determining and when the position of the vehicle acquired exits said first range of the facility range.

6. The map information processing apparatus according to claim 5, wherein at and after the determination that said vehicle has entered said facility range in said determining, a road link other than said one road link used in the determination from among the road links associated with said facility range is used as said exit road link.

7. A map information processing apparatus according to claim 1, wherein said first range of the facility has a shape obtained by enlarging or reducing the shape of said facility range.

8. The map information processing apparatus according to claim 1, wherein the vehicle position detector includes one of a global positioning system receiver or a communicating device.

9. A map information processing apparatus comprising:
a processor to execute a program; and
a memory to store the program which, when executed by the processor, results in performance of steps comprising,
acquiring map information including a facility range,
acquiring a position of a vehicle using a vehicle position detector,
determining that, in a case where the position of the vehicle acquired has entered a predetermined first range associated with said facility range, said vehicle has entered the facility range, and
storing, between when it is determined that said vehicle has entered said facility range in said determining and when the position of the vehicle acquired exits said first range of the facility range, a determination history of said entry,
wherein whether a current point of time is at a midpoint of a period between when it is determined that said vehicle has entered the facility range in said determining and when the position of the vehicle acquired exits said first range of the facility range is determined based on whether the determination history of said entry is stored in said storing.

10. A method of processing map information, comprising:
specifying map information including a facility range and road links, at least one of the road links being associated with said facility range;
acquiring a position of a vehicle using a vehicle position detector;
acquiring one road link brought into correspondence with the position of the vehicle by comparing the position of the vehicle acquired with the road links of said map information; and
determining that, in a case where the one road link acquired is the road link associated with said facility range and the position of the vehicle acquired has entered a predetermined first range associated with said facility range, said vehicle has entered the facility range.

* * * * *